No. 626,850.  
C. O. BARNES.  
BACK PEDALING BRAKE.  
(Application filed Dec. 27, 1898.)  
Patented June 13, 1899.

(No Model.)  
2 Sheets—Sheet 1.

Witnesses:  
Chas. F. Burkhart.  
Henry L. Dick.

Charles O. Barnes. Inventor.  
By Wilhelm Bonner.  
Attorneys.

THE NORRIS PETERS CO., PHOTO-LITHO., WASHINGTON, D. C.

No. 626,850. Patented June 13, 1899.
C. O. BARNES.
BACK PEDALING BRAKE.
(Application filed Dec. 27, 1898.)
(No Model.) 2 Sheets—Sheet 2.
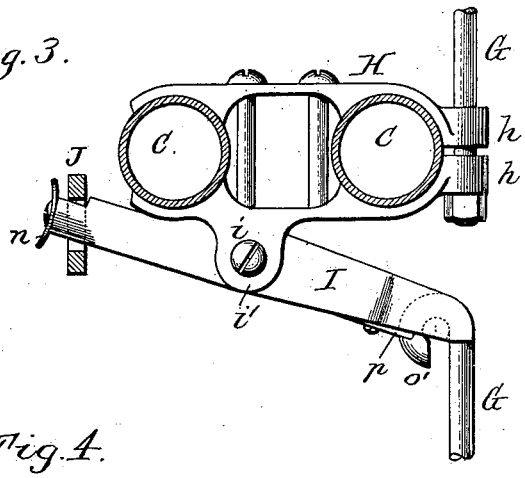
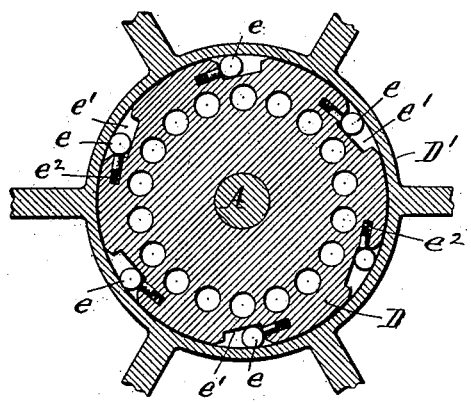
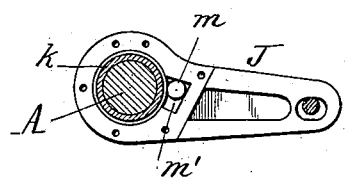
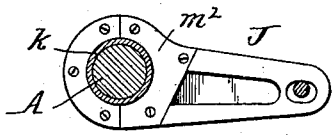
Witnesses:
Chas. F. Burkhart.
Henry L. Deck.
Charles O. Barnes Inventor.
By Wilhelm Bonner
Attorneys.

UNITED STATES PATENT OFFICE.

CHARLES O. BARNES, OF BUFFALO, NEW YORK, ASSIGNOR OF ONE-FOURTH TO EDWARD A. JONES, OF SAME PLACE.

BACK-PEDALING BRAKE.

SPECIFICATION forming part of Letters Patent No. 626,850, dated June 13, 1899.

Application filed December 27, 1898. Serial No. 700,331. (No model.)

*To all whom it may concern:*

Be it known that I, CHARLES O. BARNES, a citizen of the United States, residing at Buffalo, in the county of Erie and State of New York, have invented new and useful Improvements in Back-Pedaling Brakes, of which the following is a specification.

This invention relates to a cycle-brake of the class commonly known as "coaster-brakes" or "combined coasters and brakes."

My invention has for its objects to provide a reliable brake of this character which shall be simple, compact, and inexpensive in construction, which avoids all contact with the wheel-tires, and in which the parts are located adjacent to the crank-shaft hanger in such manner as to be convenient of assemblage and easy of access for making repairs.

Figure 1:
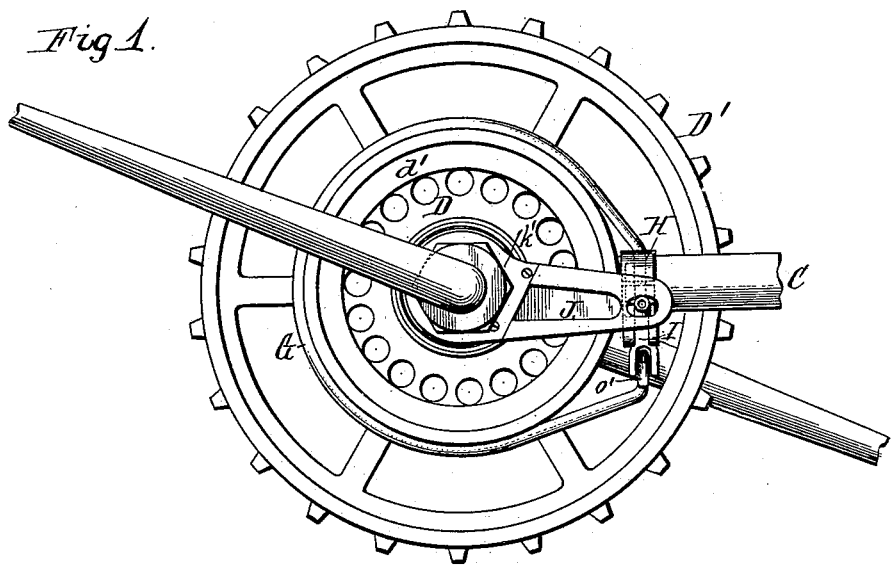
Figure 2:
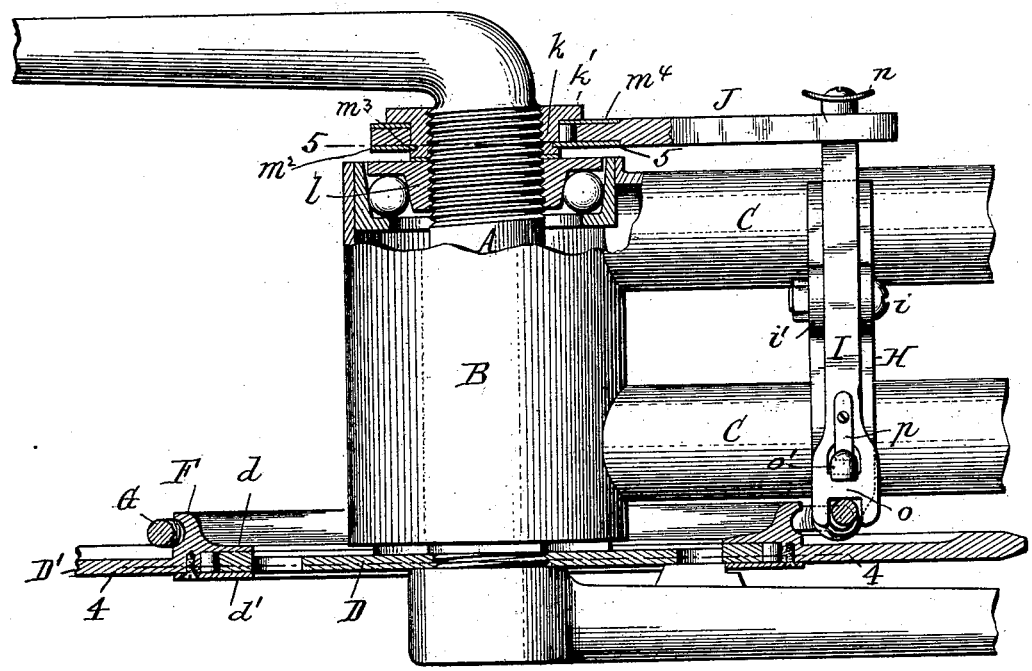

In the accompanying drawings, consisting of two sheets, Figure 1 is a side elevation of the crank-shaft, sprocket-wheel, and adjacent parts of a bicycle equipped with my improved coaster-brake, the retaining-washer of the actuating-arm being omitted. Fig. 2 is a bottom plan view thereof, partly in horizontal section. Fig. 3 is a transverse section of the machine, taken immediately in rear of the transverse brake-lever. Fig. 4 is a cross-section in line 4 4, Fig. 2, on a reduced scale. Fig. 5 is a cross-section in line 5 5, Fig. 2, on a reduced scale, with the inner face-plate of the brake-actuating arm removed. Fig. 6 is a similar section showing said face-plate in place.

Like letters of reference refer to like parts in the several figures.

A is the crank-shaft, B the hanger supporting the shaft and having ball-bearings of any ordinary or approved form, and C the frame tubes or members extending from the rear side of the hanger. In the drawings two parallel tubes are shown; but a single tube may be employed, if desired.

The sprocket or driving wheel, which is mounted on the crank-shaft, consists of an inner disk or hub portion D, rigidly secured to the shaft by any suitable means, and an outer or rim portion D', mounted loosely on the hub and connected therewith by a clutch of any suitable construction, which compels the rim portion to turn forwardly with the crank-shaft in propelling the machine, but allows the rim to turn forward freely independently of the hub and the crank-shaft when the latter remains at rest in coasting. In the construction shown in the drawings the rim portion is confined upon the hub by an integral annular flange $d$, extending inwardly from the central opening of the rim on one side of the wheel, and a ring or cap $d'$, secured to the opposite side of the rim portion by screws $d^2$ or other suitable means, as shown in Fig. 2. The clutch preferably consists of transverse rollers $e$, arranged in recesses $e'$, which are formed in the periphery of the hub D and provided with inclined bottoms, between which and the inner surface of the sprocket-rim the rollers are wedged by the forward rotation of the crank-shaft, thus compelling the rim to turn forward with the shaft in an obvious manner, while releasing the rollers and permitting the rim to turn forward independently of the shaft when the latter is held stationary in coasting. The rollers are preferably forced toward the narrow ends of the recesses by springs $e^2$, as shown in Fig. 4.

F is a narrow brake-rim arranged on the inner side of the sprocket-rim D' and preferably formed integrally therewith, and G is a brake-band which nearly encircles said brake-rim and is seated in an annular groove formed in the same. One end of the brake-band is rigidly secured to the frame of the machine in rear of the hanger by any suitable attachment, the preferred means consisting of a divided clip or clamp H, which embraces the frame-tubes. This clip is provided at the side facing the sprocket-wheel with perforated lugs $h$, through which the adjacent end portion of the brake-band passes and in which it is secured by a nut applied to the projecting end thereof, as shown in Fig. 3. The opposite end of the brake-band terminates near the clip H and is connected with one arm of a brake-lever I, arranged transversely on the under side of the frame members C and pivoted by a longitudinal pin $i$ to a bifurcated lug $i'$, which depends from said clip, as shown in Fig. 3, so that upon depressing the opposite arm of this lever the arm connected with the band is swung upward or toward the supporting-clip, thereby contracting the band and applying the brake.

The free end of the brake-lever is actuated in back-pedaling by an arm J, extending rearwardly from the crank-shaft and arranged on the side of the hanger opposite the sprocket-wheel. This actuating-arm is connected with the shaft by a clutch of any ordinary or suitable construction, which allows the shaft to turn forward without affecting the arm, but couples the arm to the shaft and compels the same to turn therewith when the shaft is turned backward, so that upon back-pedaling the actuating-arm is swung downward and caused to swing the brake-lever in the proper direction to tighten the brake-band. A roller-clutch similar to that of the sprocket-wheel, but arranged reversely thereto, is preferably employed for this purpose. In this case the inner member of the clutch preferably consists of a sleeve $k$, which forms a reduced extension of the usual jam-nut $k'$, whereby the adjustable bearing-cone $l$ is locked in place, as shown in Fig. 2. The hub of the actuating-arm J is loosely mounted on this extension. The roller $m$ of the clutch is in this case arranged in a recess $m'$, formed in the hub of the actuating-arm, and the latter is confined against lateral displacement on the extension $k$ by the flanged outer end of the nut $k'$ and a divided plate or cap $m^2$, removably secured to the inner side of the arm and engaging in an annular groove $m^3$, formed in the extension of the jam-nut, as shown in Fig. 2. The roller-recess of the actuating-arm is covered on its inner side by the divided plate $m^2$ and on its opposite side by a plate $m^4$, brazed or otherwise secured to the arm.

As shown in Fig. 1, the free end of the brake-lever I passes through a horizontal slot or elongated opening of the actuating-arm. The latter is reliably retained upon the brake-lever by a washer $n$, which is of greater width than said opening and secured to the free end of the brake-lever. The opposite end of this lever is forked, and the jaws of the fork are connected by a transverse pin $o$, which is embraced by a hook $o'$ on the adjacent end of the brake-band. The opening of the hook is just as wide as the smallest diameter or transverse dimension of the pin $o$, so that the hook can be engaged with the pin only by bringing the narrow portion of the pin in line with the opening of the hook. The flat side of the pin faces downwardly in all positions of the brake-lever, as shown in Fig. 3, so that the lever must be brought parallel with the brake-band in order to disconnect the parts, which position the lever can assume only after removing it from the clip H. To prevent the hook from being sprung out of engagement with the pin $o$ of the brake-lever, a retaining-bar $p$ may be employed, which is secured to the under side of the lever and engages in a notch formed in the hook, as shown in Fig. 3.

In propelling the machine in the ordinary way the sprocket-rim is caused to turn forwardly with the crank-shaft by the coasting-clutch; but the actuating-arm J remains at rest, owing to the reverse arrangement of its clutch, as hereinbefore described, allowing the brake-band to remain loose. In coasting the rider simply keeps his feet at rest on the pedals, when the sprocket-rim and the driving-chain will continue their forward movement independent of the crank-shaft in a well-known manner. To apply the brake, the rider back-pedals. The backward movement of the crank-shaft causes the actuating-arm to move downward, thereby swinging the brake-lever on its pivot, tightening the brake-band upon the brake-rim, and retarding or arresting the progress of the machine. Upon again pedaling forward the brake-band expands and clears the brake-rim by reason of its elasticity and returns the parts to their former position.

In my improved coaster-brake all of the parts are compactly arranged adjacent to the hanger, where they are conveniently accessible for making repairs, and no connections are employed between the hanger and the rear-wheel hub, as in brakes arranged partly on the crank-shaft and partly on the rear wheel or rear axle. As the brake operates against the sprocket-wheel, it avoids the wear and liability of slipping incident to braking against the wheel-tires, while the large contact-surface afforded by the brake-band renders the brake reliable in action and requires comparatively little exertion to effectively apply the same. By arranging the actuating-arm and the brake band and rim on opposite sides of the hanger and transmitting the movement of the arm to the band by a transverse lever, as shown, the strain upon the hanger is balanced or equalized.

I claim as my invention—

1. The combination with the crank-shaft, and a sprocket or driving wheel mounted loosely thereon and having a brake-rim, of an interposed clutch which compels the driving-wheel to turn forwardly with the shaft but allows the shaft to turn backward independently thereof, a brake-band which embraces said brake-rim and is secured at one end to a stationary part of the machine, an actuating or tightening device for the brake-band connected with the opposite end of the latter, and a second clutch connecting said actuating device with the crank-shaft and arranged reversely to the first-named clutch, substantially as set forth.

2. The combination with the crank-shaft, the sprocket or driving wheel, and an interposed clutch which compels the driving-wheel to turn forwardly with the shaft but allows the shaft to turn backward independently thereof, of a brake which operates against said driving-wheel, an actuating-arm connected with the crank-shaft by a clutch operating reversely to said driving-wheel clutch, and a brake-lever arranged transversely of the machine and connecting the brake with said actuating-arm, substantially as set forth.

3. The combination with the crank-shaft of a velocipede, and a sprocket or driving wheel mounted loosely thereon and having a brake-rim, of a coasting-clutch which compels the driving-wheel to turn forwardly with the shaft, but allows the shaft to turn backward independently thereof, a brake-band which embraces said brake-rim and is secured at one end to a stationary part of the machine, an actuating-arm connected with the crank-shaft by a clutch operating reversely to said coasting-clutch, and a transverse brake-lever mounted on the velocipede-frame and connecting the opposite end of the brake-band with said actuating-arm, substantially as set forth.

4. The combination with a crank-shaft, the sprocket or driving wheel, and an interposed clutch which compels the driving-wheel to turn forwardly with the shaft but allows the shaft to turn backward independently thereof, of a brake, a nut applied to the shaft and having a cylindrical extension, and an actuating-arm for the brake mounted loosely on said extension and connected therewith by a clutch which operates reversely to the clutch of the driving-wheel, substantially as set forth.

5. The combination with the crank-shaft, the sprocket or driving wheel, and an interposed clutch which compels the driving-wheel to turn forwardly with the shaft but allows the shaft to turn backward independently thereof, of a brake, a nut applied to the shaft and having a cylindrical extension provided with an annular groove, an actuating-arm for said brake mounted loosely on said extension and connected therewith by a clutch which operates reversely to the clutch of the driving-wheel, and a divided cap or ring secured to the side of said actuating-arm and engaging in said groove, substantially as set forth.

Witness my hand this 15th day of December, 1898.

CHARLES O. BARNES.

Witnesses:
CARL F. GEYER,
HENRY L. DECK.